United States Patent
Choi et al.

(10) Patent No.: US 8,589,995 B2
(45) Date of Patent: Nov. 19, 2013

(54) SERVER AND METHOD FOR PROVIDING SYNCHRONIZATION INFORMATION, CLIENT APPARATUS AND METHOD FOR SYNCHRONIZING ADDITIONAL INFORMATION WITH BROADCAST PROGRAM

(75) Inventors: Chang-hwan Choi, Seoul (KR); Tae-ung Jung, Suwon-si (KR); Hee-seon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 12/706,254

(22) Filed: Feb. 16, 2010

(65) Prior Publication Data

US 2010/0229201 A1 Sep. 9, 2010

(30) Foreign Application Priority Data

Mar. 3, 2009 (KR) ........................ 10-2009-0018015

(51) Int. Cl.
*H04N 7/173* (2011.01)
(52) U.S. Cl.
USPC ............................. 725/113; 725/115; 725/116
(58) Field of Classification Search
None
See application file for complete search history.

(56) References Cited

U.S. PATENT DOCUMENTS

| | | | |
|---|---|---|---|
| 2005/0031315 A1 | 2/2005 | Kageyama et al. | |
| 2005/0228849 A1* | 10/2005 | Zhang | 709/200 |
| 2007/0136773 A1* | 6/2007 | O'Neil et al. | 725/100 |
| 2008/0082523 A1 | 4/2008 | Momosaki et al. | |
| 2009/0040372 A1* | 2/2009 | Bae et al. | 348/436.1 |
| 2009/0228921 A1 | 9/2009 | Miki et al. | |
| 2009/0276807 A1* | 11/2009 | Robotham | 725/40 |
| 2010/0121936 A1* | 5/2010 | Liu et al. | 709/217 |
| 2010/0162303 A1* | 6/2010 | Cassanova | 725/37 |
| 2011/0213760 A1* | 9/2011 | Bardsley et al. | 707/705 |

FOREIGN PATENT DOCUMENTS

| | | |
|---|---|---|
| JP | 2007-251743 | 9/2007 |
| JP | 2008-84115 | 4/2008 |
| JP | 2008-129884 | 6/2008 |
| JP | 2008-135045 | 6/2008 |
| JP | 2008-160337 | 7/2008 |

* cited by examiner

*Primary Examiner* — Chris Parry
(74) *Attorney, Agent, or Firm* — NSIP Law

(57) ABSTRACT

A synchronization information providing server to synchronize a broadcast program with additional information related to the broadcast program, a synchronization information providing method of synchronizing a broadcast program with additional information related to the broadcast program, a client apparatus to process synchronization information received from the synchronization information processing server and a method of processing synchronization information received from the synchronization information processing server are provided. The synchronization information providing server manages metadata of a broadcast frame constituting a broadcast program and additional information related to the metadata. The metadata includes time information and image feature information of the broadcast frame. Upon receiving synchronization request information, which includes time information and image feature information about at least one broadcast frame of a predetermined broadcast program, synchronization information to synchronize the predetermined broadcast program with additional information related to the predetermined broadcast program is provided to the client apparatus.

13 Claims, 7 Drawing Sheets

FIG.4

| TIME | 1 | 2 | 3 | 4 | 5 | 6 | 7 | 8 | 9 | 10 | 11 | 12 | 13 | ... |
|---|---|---|---|---|---|---|---|---|---|---|---|---|---|---|
| IMAGE FEATURE INFORMATION | RED | WHITE | ORANGE | WHITE | WHITE | YELLOW | WHITE | WHITE | WHITE | BLUE | WHITE | WHITE | WHITE | ... |
| ADDITIONAL INFORMATION | RED | X | ORANGE | X | X | YELLOW | X | X | X | BLUE | X | X | X | ... |

FIG.5

| BROADCAST PROGRAM IDENTIFYING INFORMATION ||||
|---|---|---|---|
| ADDITIONAL INFORMATION IDENTIFIER | TIME INFORMATION | IMAGE FEATURE INFORMATION | ADDITIONAL INFORMATION |
| 1 | 00:13:57 | RED | MUSIC VIDEO |
| 2 | 00:32:25 | ORANGE | ADVERTISEMENT |
| 3 | 00:36:42 | YELLOW | ADVERTISEMENT |
| ... | ... | ... | ... |

US 8,589,995 B2

SERVER AND METHOD FOR PROVIDING SYNCHRONIZATION INFORMATION, CLIENT APPARATUS AND METHOD FOR SYNCHRONIZING ADDITIONAL INFORMATION WITH BROADCAST PROGRAM

CROSS-REFERENCE TO RELATED APPLICATION

This application claims the benefit under 35 U.S.C. §119 (a) of a Korean Patent Application No. 10-2009-0018015, filed on Mar. 3, 2009, the disclosure of which is incorporated herein by reference in its entirety for all purposes.

BACKGROUND

1. Field

The following description relates to a broadcasting service, and more particularly, to an apparatus to provide additional information together with broadcast contents, and a method is thereof.

2. Description of the Related Art

Recently, an increase of Air broadcasting, cable broadcasting, satellite digital multimedia broadcasting (DMB), terrestrial digital multimedia broadcasting (DMB), and internet protocol televisions (IPTV) has allowed users to enjoy a great amount of broadcast contents through various terminals. In particular, as two-way data broadcasting services are becoming more widely used, there is an increasing user demand to not only watch a program but to also demand additional information regarding merchandise used by performers, clothes of performers, or the location at which the program was filmed during the broadcasting. In other words, merchandise associated with various programs and celebrities is in high demand. Accordingly, as demands for such detailed information about the program have grown, a service to provide additional information corresponding to the broadcasting contents is needed.

SUMMARY

In one general aspect, there is provided a synchronization information providing server including an addition information manager to manage metadata and additional information related to the metadata in a unit of a broadcast program, wherein the metadata includes time information and image feature information of broadcast frames constituting the broadcast program, and a synchronization manger, if receiving synchronization request information, which to includes time information and image feature information about at least one broadcast frame of a predetermined broadcast program from a client apparatus, to provide the client apparatus with synchronization information to synchronize the predetermined broadcast program with additional information related to the predetermined broadcast program by use of the synchronization request information, the metadata and the additional information.

The additional information manager may generate the metadata corresponding to the broadcast program while recording the broadcast program based on electric program guide (EPG) information.

The additional information manager may generate the metadata by extracting the time information and the image feature information from the broadcast frame at predetermined times set corresponding to each of the broadcast programs.

In response to the synchronization manager receiving synchronization request information including time information and image feature information about at least one broadcast frame of a predetermined broadcast program, the synchronization manager may compare the image feature information included in the synchronization request information with a plurality of pieces of image feature information of metadata of the predetermined broadcast program, the plurality of pieces of image feature information related to a plurality of pieces of time information corresponding to a predetermined time section which includes the time information included in the synchronization request information, and provide the client apparatus with identification information of additional information mapped to image feature information, which is included in the metadata of the predetermined broadcast program and is determined to be similar to the image feature information included in the synchronization request information, as the synchronization information.

The synchronization manager may provide the client apparatus with a list of additional information that includes broadcast program identifying information, at least one piece of to additional information mapped to time information and image feature information of a broadcast frame to be synchronized, and an identifier to identify the at least one piece of additional information.

The time information may correspond to system time table (STT) information of a program and system information protocol (PSIP).

The image feature information may correspond to at least one of an MPEG-7 color layout descriptor (CLD) and an MPEG-7 edge histogram descriptor (EHD).

The synchronization manager may provide the synchronization information in response to the synchronization request information received at preset time intervals.

In another general aspect, there is provided a client apparatus, including a controller to extract time information and image feature information about broadcast frames from received broadcasting signals to generate synchronization request information including time information and image feature information about a predetermined broadcast program, and a communicator to transmit the synchronization request information to a synchronization information providing server and receive synchronization information to synchronize the predetermined broadcast program with additional information related to the predetermined broadcast program from the synchronization information providing server, wherein the controller synchronizes a broadcast frame with additional information related to the broadcast frame using the synchronization information.

The communicator may receive a list of additional information that includes broadcast program to identify information, at least one additional information mapped to time information and image feature information of a broadcast frame to be synchronized, and an identifier to identify the at least one additional information.

The client apparatus may further include a synchronization screen configuration unit to configure a screen by synchronizing a received broadcast frame with additional information related to the received broadcast frame, wherein the synchronization screen configuration unit configures a synchronization screen by use of additional information corresponding to an additional information identifier indicated by the synchronization information included in the additional information list.

In another general aspect, there is provided a method of providing synchronization information, the method including managing metadata and additional information related to the metadata in a unit of a broadcast program, wherein the metadata includes time information and image feature information of broadcast frames including the broadcast program, receiving synchronization request information including time information and image feature information about at least one broadcast frame of a predetermined broadcast program from a client apparatus, and providing synchronization information to synchronize the predetermined broadcast program with additional information related to the predetermined broadcast program to the client apparatus by use of the synchronization request information, the metadata and the additional information.

The managing of the additional information may include generating the metadata corresponding to the broadcast program while recording the broadcast program based on electric program guide (EPG) information.

The managing of the additional information may include generating the metadata by extracting the time information and the image feature information from the broadcast frame at predetermined time intervals preset corresponding to each of the broadcast programs.

The providing of the synchronization information may include comparing the image feature information included in the synchronization request information with a plurality of pieces of image feature information of the metadata of the predetermined broadcast program, the plurality of pieces of image feature information related to a plurality of time information corresponding to a predetermined time section which includes the time information included in the synchronization request information, and providing the client apparatus with identification information of additional information mapped to image feature information, which is included in the metadata and is determined to be similar to the image feature information included in the synchronization request information, as the synchronization information.

Before the providing of the synchronization information, the method may further include providing the client apparatus with a list of additional information that includes broadcast program identifying information, at least one piece of additional information mapped to time information and image feature information of a broadcast frame to be synchronized, and an identifier to identify the at least one piece of additional information.

The synchronization information may be provided in response to the synchronization request information received at preset time intervals.

In another general aspect, there is provided a method of synchronizing additional information with a broadcast program, the method including extracting time information and image feature information about broadcast frames from received broadcasting signals to generate synchronization request information including time information and image feature information about a predetermined broadcast program, transmitting the synchronization request information to a synchronization information providing server, receiving synchronization information to synchronize the predetermined broadcast program with additional information related to the predetermined broadcast program from the synchronization information providing server, and synchronizing broadcast frame with additional information related to the broadcast frame by use of the synchronization information.

The method may further include receiving a list of additional information that includes broadcast program identifying information, at least one piece of additional information mapped to time information and image feature information of a broadcast frame to be synchronized, and an identifier to identify the at least one piece of additional information.

The synchronizing of the broadcast frame with additional information related to the broadcast frame using the synchronization information may further include configuring a synchronization screen by use of additional information corresponding to an additional information identifier indicated by the synchronization information included in the additional information list.

Other features will become apparent from the following detailed description, the drawings, and the claims.

BRIEF DESCRIPTION OF THE DRAWINGS

FIG. 4 is a view illustrating examples of metadata and additional information which are managed by the synchronization information providing server.

FIG. 5 is a view illustrating an example of a list of additional information that is provided from the synchronization information providing server to the client apparatus.

Other features and aspects will be apparent from the following detailed description, the drawings, and the claims.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and constructions may be omitted for increased clarity and conciseness.

Figure 1:
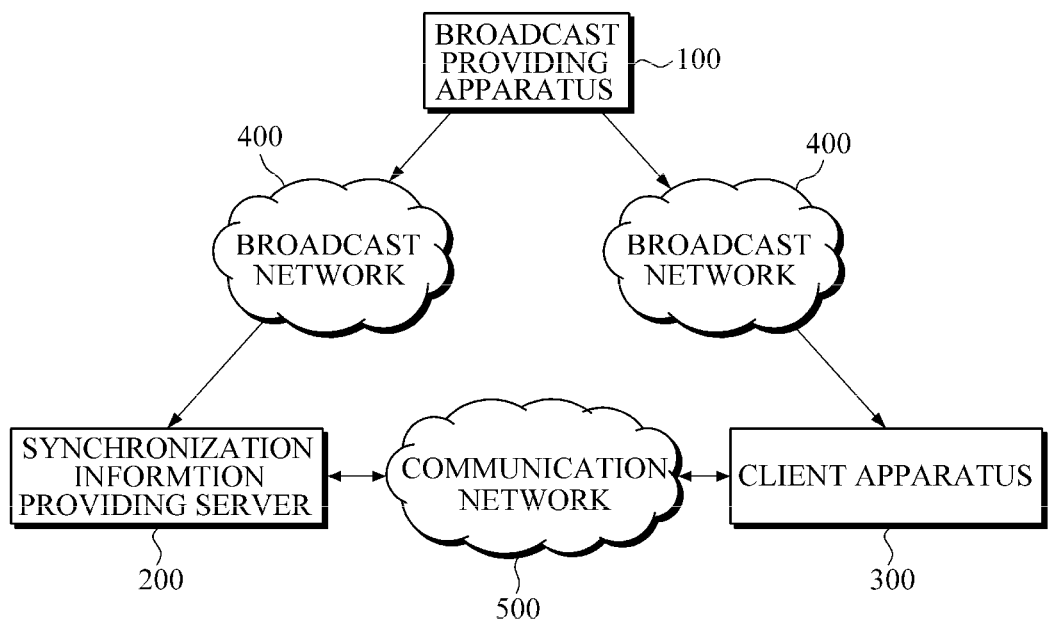
FIG. 1 is a view illustrating an example of an environment in which a client apparatus receives a broadcast program from a broadcasting providing apparatus and a synchronization information providing server.

FIG. 1 illustrates an example of an environment in which a client apparatus receives a broadcast program from a broadcast providing apparatus and a synchronization information providing server.

A broadcast providing apparatus 100 transmits a broadcasting signal including a broadcast program such as an Audio/Video stream and information about a broadcast program to a synchronization information providing server 200 and a client apparatus 300 through broadcasting media 400 such as a terrestrial transmission device, a satellite, the Internet, or by a broadcast network such as cable. The information about the broadcast program may include electronic program guide (EPG) information and descriptive information about an individual broadcast program.

The client apparatus 300 is a user terminal to provide a broadcast program. The client apparatus 300 may provide a broadcast program received from the broadcast providing apparatus 100 through a broadcasting channel such as a satellite channel, an Air channel, an Internet channel or a cable channel. The client apparatus 300 may be provided in the form of, for example, a personal computer, a set top box, a digital television, a mobile phone or a personal digital assistant (PDA).

In response to the broadcast providing apparatus 100 broadcasting a broadcast program, and where the client apparatus 300 receives additional information to be synchronized with the broadcast program through a broadcasting channel or a two-way communication channel such that the additional information includes information about merchandize used by performers, clothes of performers, or a location of filming of the program, the client apparatus 300 synchronizes the additional information with the broadcast program and subsequently provides the synchronized additional information. Such additional information is synchronized with the broadcast program using time information of the broadcast program provided from the broadcast providing apparatus 100.

For example, at least one additional piece of information may be mapped to time information of a broadcast frame related to the additional information. The broadcast frame represents broadcasting program data that is provided in a unit of a frame, in which the broadcast program is configured through various media such as audio and/or video apparatuses. In order to perform a synchronization of the broadcast frame with additional information, the client apparatus 300 determines a start time of a broadcast program, and calculates a time point of a broadcast frame which is broadcast at a particular moment by a viewer based on the start time, such that that additional information mapped to the time point may be provided.

The broadcast providing apparatus 100 may edit a part of a broadcast program and provide the edited broadcast program to the client apparatus 300. In addition, in the case that the broadcast providing apparatus 100 provides a broadcast program to other broadcast providers, for example, a plurality of cable broadcasting stations and IPTV broadcasters, the other broadcast providers edit a part of broadcast contents and provide the edited broadcast contents to the client apparatus 300 at another time other than the actual air time of the broadcast program through a different channel to the channel used by the broadcast providing apparatus 100.

However, in the case that a broadcast program is synchronized with additional information based on time information, which is included in the broadcast program and has been used when creating the additional information, where a broadcasting station or another broadcasting station transmits an edited broadcast program, a predetermined broadcast frame of the edited broadcast program may have time information different from time information of an is original broadcast frame. This effect occurs due to the edited part of the broadcast program. That is, in this manner, where time information serving as a standard for synchronization is changed, additional information is not output in synchronization with a broadcast frame related to the additional information. Accordingly, additional information is not properly synchronized with the edited broadcast program.

The exemplary synchronization information providing server 200 provides the client apparatus 300 with synchronization information for synchronizing a broadcast frame with additional information such that additional information related to the broadcast frame of the broadcast program is provided. In addition, even if a broadcast program, which has been edited, is received at another time through another channel, the client apparatus 300 synchronizes already produced additional information of the broadcast program with the edited broadcast program being broadcasted at present.

The synchronization information providing server 200 is connected to the client apparatus 300 through a two-way communication network 500 such as the Internet. The synchronization information providing server 200 may include a database (not illustrated) which records a broadcasting signal to store a broadcast program including an AV (audio/video) stream and information about a broadcast program. The synchronization information providing server 200 allows the client apparatus 300 to provide a broadcast program, which is received from the broadcast providing apparatus 100, together with additional information about the corresponding broadcast program. The addition information may be generated from the synchronization information providing server 200 or from another content providing apparatus and then provided to the client apparatus 300.

Hereinafter, a configuration and an operation of the synchronization information providing server 200 and the client apparatus 300 will be further described.

Figure 2:
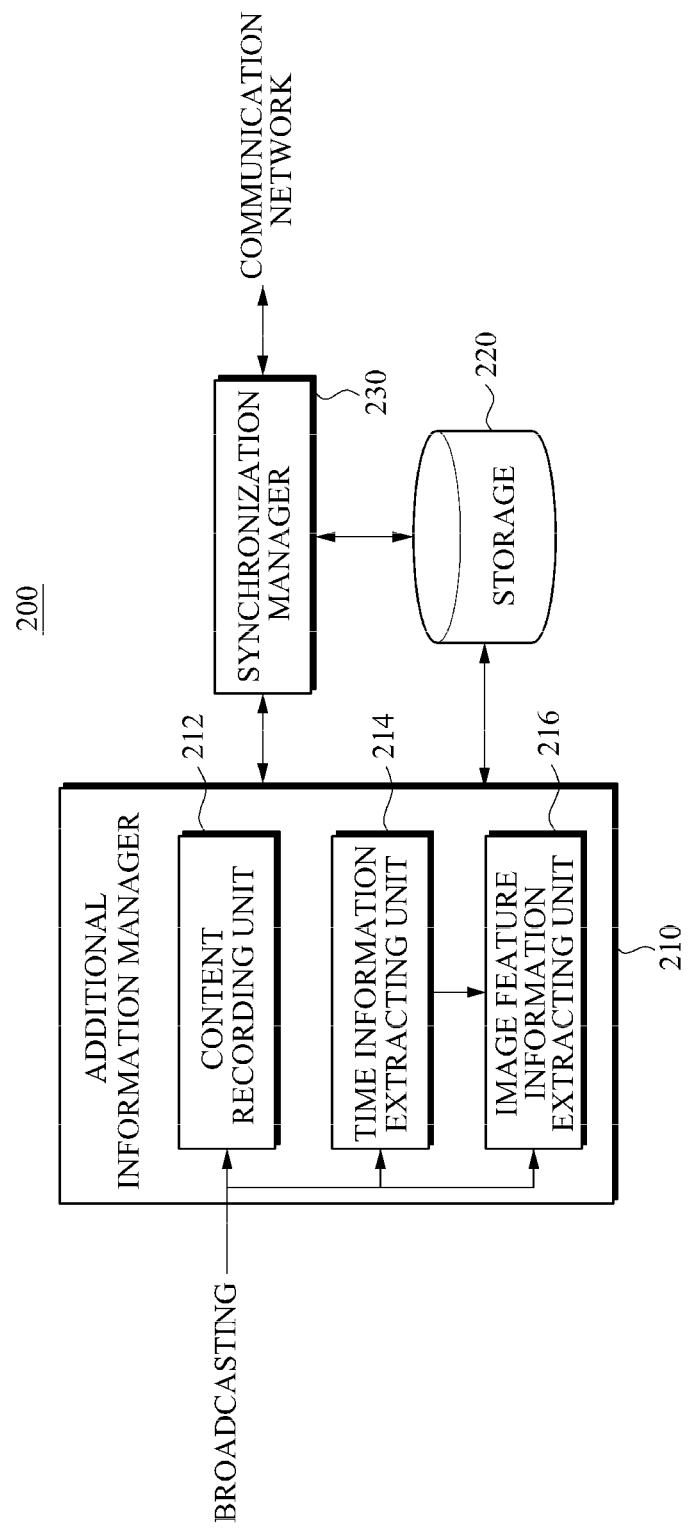
FIG. 2 is a view illustrating an example of a synchronization information providing server.

FIG. 2 illustrates an example of a synchronization information providing server 200.

The synchronization information providing server 200 includes an additional information manager 210, a storage unit 220 and a synchronization manager 230.

The additional information manager 210 manages metadata, which includes time information and image feature information of broadcast frames constituting a broadcast program, and additional information related to the metadata. The additional information manager 210 may generate metadata corresponding to each broadcast program while recording the broadcast program based on electronic program guide (EPG) information. The additional information manager 210 may generate the metadata by extracting the time information and the image feature information from the broadcast frames at predetermined time intervals preset corresponding to each broadcast program.

The additional information manager 210 may include a content recording unit 212, a time information extracting unit 214 and an image feature information extracting unit 216.

The content recording unit 212 determines whether a program, which needs to be recorded, exists by checking a schedule table such as EPG information stored in the storage unit 220. If a program to be recorded exists, the content recording unit 212 starts recording the program. Where the broadcast program is recorded, the time information extracting unit 214 extracts time information from the broadcast program at predetermined time intervals.

Where the time information is extracted from a broadcast frame at predetermined time intervals, the image feature information extracting unit 216 captures the broadcast frame and stores an image of the broadcast frame. After that, the image feature information extracting unit 216 extracts image feature information such as a color layout descriptor (CLD) and an edge histogram descriptor (EHD) from the obtained image. The extracting of the time information and the image feature information is repeated until the recording of the program ends.

The time information and the image feature information are not limited thereto and may is be provided in various forms. For example, the time information may be a system time table (STT) of a program and system information protocol (PSIP). STT includes one of tables constituting the PSIP and is used to represent information about data and time at a particular moment.

An example of image feature information may include at least one of MPEG-7 color layout descriptor (CLD) and MPEG-7 edge histogram descriptor (EHD).

The CLD is a descriptor used to represent a discrete cosine transform (DCT) coefficient of representative colors yellow, blue, and red (Y, Cb and Cr) corresponding to 8×8 blocks which are obtained by splitting an input image space. To use the CLD to perform image retrieval, a non-linear inverse quantization is performed using values of low-frequency area which includes 6 Y component values, 3 Cb component and 3 Cr component values and corresponds to an upper portion in DCT conversion values. After that, the representative color of the image space obtained by taking 8×8 inverse DCT results may be used to retrieve the image.

The EHD of MPEG 7 is a descriptor used to effectively represent edge information of an image. The EHD represents the spatial distribution of five types of edges on local image regions. The five types of edges include four directional edges and one non-directional edge. The four directional edges include a vertical edge, a horizontal edge, a 45-degree diagonal edge and a 135-degree diagonal edge. The local image regions having such edges are referred to as sub-images.

A process of extracting an edge histogram from an image is performed as follows. First, the image is divided into 16 sub-images (4×4), and then edge detection filter coefficients are determined to extract edge features of the image. Accordingly, a single image block, that is, the single sub-image is divided into four sub-blocks. Subsequently, the edge detection filter coefficient is determined by use of a luminance mean value of the sub-blocks. Edge intensities of the five edges are measured with respect to an image block using the edge detection filter coefficient, thereby determining an edge having the greatest intensity. Where the intensity of the edge exceeds a critical value, the image block is determined to have the edge component. For example, where the intensity of vertical edge component exceeds the intensities of remaining edge components and also exceeds a critical value, the image block is determined to have a feature of the vertical edge component.

The metadata is stored in the storage unit 220 or a predetermined area in the form of a file in reference with an inherent key value which is generated using program information such as a title of a broadcast program. That is, broadcast programs are stored with reference to each inherent key value. The program information of respective programs are compared to each other in response to a client apparatus requesting synchronizing of additional information to a corresponding program.

The additional information manager 210 may generate additional information related to a desired image frame in reference with the metadata generated as described above. Alternatively, the additional information manager 210 may provide the generated metadata to another content provider (not illustrated) such that the another content provider generates additional information based on the provided metadata.

Referring to FIGS. 1 and 2, in response to the synchronization manager 230 receiving synchronization request information, which includes time information and image feature information about at least one broadcast frame of a predetermined broadcast program, from the client apparatus 300, the synchronization manager 230 provides the client apparatus 300 with synchronization information to synchronize the predetermined broadcast program with additional information related to the predetermined broadcast program by use of the synchronization request information, the metadata and the additional information. That is, even where time information of broadcast programs changes, the client apparatus 300 retrieves an image similar to a present image of a broadcast currently being received to the client apparatus 300 using the image feature information and provides an user with additional information corresponding to the present image of the broadcast currently received to the client apparatus 300.

That is, where the synchronization manager 230 receives synchronization request information, which includes time information and image feature information about at least one broadcast frame of a predetermined broadcast program, from the client apparatus 300, the synchronization manager 230 selects a plurality of image feature information, which is related to a plurality of pieces of time information corresponding to a predetermined time section interposing the time information included in the synchronization request information, from the metadata of the predetermined broadcast program. For example, where the client apparatus 300 extracts STT time information from a broadcast program being broadcast at a particular time and sends the extracted STT time information in the synchronization request information to the synchronization information providing server 200, the synchronization manager 230 determines image feature information, which corresponds to a predetermined section compared with the image feature information included in the synchronization request information, by use of the STT time information.

The image feature information which is compared with the image feature information included in the synchronization request information may correspond to a plurality of pieces of image feature information included within the predetermined section which is determined based on the time information included in the synchronization request information. For example, where time information included in synchronization request information is 100, image feature information of broadcast frames corresponding to a time section between 50 and 150 are determined to be compared with the image feature information included in the synchronization request information. That is, the image feature information obtained from the client apparatus 300 is not compared with image feature information, which is stored in the synchronization information providing server 200 and corresponds to the time information of 100, but with a is plurality of pieces of image feature information belonging to a predetermined time section adjacent to the image feature information of the time information of 100. Accordingly, even in response to a broadcast program being edited, appropriate additional information may be found. In this case, a range of the time section is not limited thereto.

The synchronization manager 230 may subsequently compare the image feature information included in the synchronization request information with the plurality of pieces of image feature information corresponding to the predetermined time section, respectively. The synchronization manager 230 provides, as synchronization information, identification information of additional information mapped to image feature information, which is determined to be similar to the image feature information included in the synchronization request information, to the client apparatus 300 through the communication network 500. The synchronization manager 230 may provide the client apparatus 300 with the synchronization information in response to the synchronization request information that is received at preset time intervals.

In addition, the synchronization manager 230 provides the client apparatus 300 with a list of pieces of additional information that includes broadcast program identifying information, at least one piece of additional information mapped to time information and image feature information of a broadcast frame to be synchronized, and an identifier to identify the at least one piece of additional information. The list of additional information is transmitted to the client apparatus 300 in response to a request of the light of additional information of the client apparatus 300. The broadcast program identifying information may include a broadcasting channel, a broadcast program title, broadcast program episodes.

Figure 3:
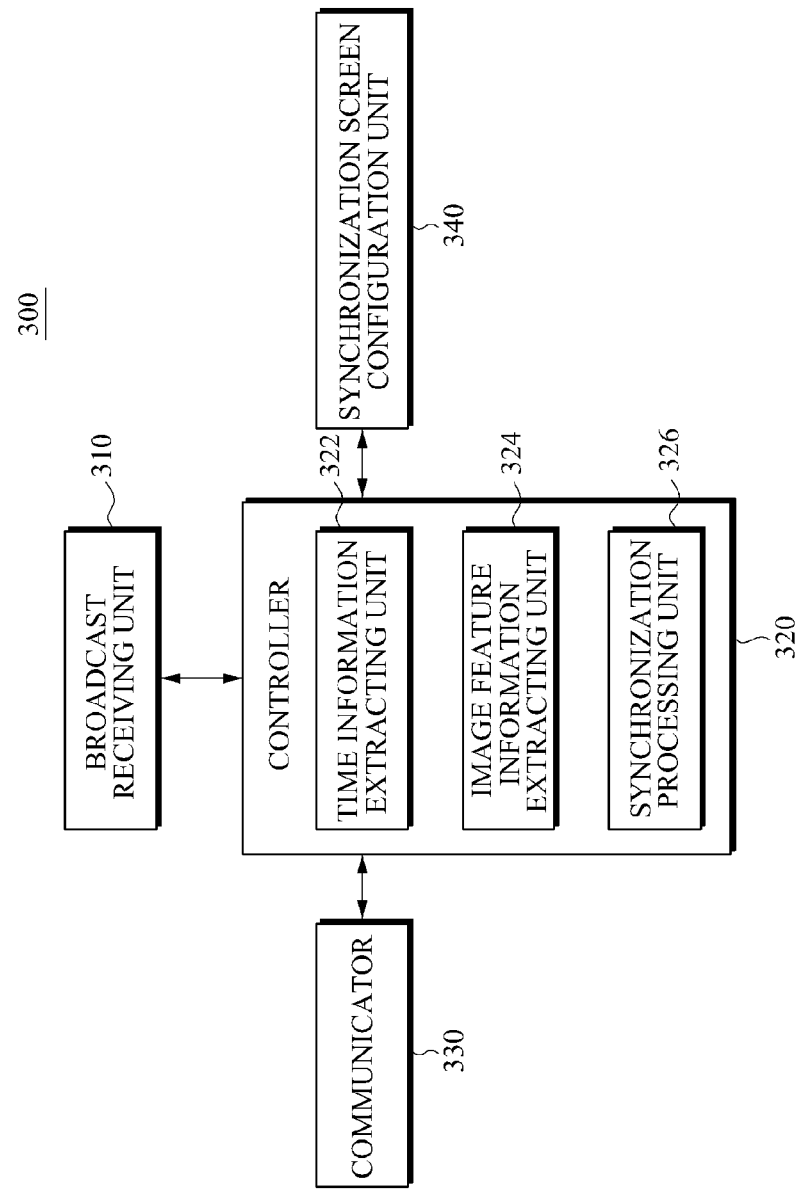
FIG. 3 is a view illustrating an example of a client apparatus.

FIG. 3 illustrates an example of a client apparatus 300.

The client apparatus 300 includes a broadcast receiving unit 310, a controller 320, a communication unit (i.e., a communicator) 330 and a synchronization screen configuration unit 340.

The broadcast receiving unit 310 may receive a broadcast program through a broadcasting channel such as a terrestrial broadcasting channel or a satellite broadcast channel, or through a two-way channel such as the Internet. Assuming that a broadcast program is received through a broadcasting signal, the broadcast receiving unit 310 may include a tuner unit (not illustrated) which performs a tuning and demodulation on the broadcast signal input through a selected channel to output a transmission stream, and a demultiplexer (not illustrated) to demultiplex the transmission stream in the form of a video stream and an audio stream.

The controller 320 controls an overall operation of the client apparatus 300, and may include a unit to decode the audio stream and the video stream. The controller 320 extracts time information and image feature information about broadcast frames from received broadcasting signals and generates synchronization request information including time information and image feature information about a predetermined broadcast program. Referring to FIGS. 1 and 3, the communication unit 330 controls communication with respect to the synchronization providing server 200 in connection with a two-way communication channel.

The controller 320 may include a time information extracting unit 322, an image feature information extracting unit 324 and a synchronization processing unit 326.

Where a predetermined broadcast program starts, the controller 320 transmits a request to retrieve a list of additional information including broadcast program identifying information, which includes present time and details of broadcast programs, to the synchronization information providing server 200 through the communication unit 330 such that the client apparatus 300 receives the list of additional information including additional information corresponding to the broadcast program being broadcast at a particular time. The list of additional information includes broadcast program identifying information, at least one piece of additional information mapped to time information and image feature information of a broadcast is to be synchronized, and an identifier to identify the at least one piece of additional information.

The synchronization processing unit 326 synchronizes additional information, which corresponds to a broadcast program being illustrated at a particular time, with a broadcast frame related to the additional information by use of the list of additional information. The synchronization screen configuration unit 340 configures a synchronization screen capable of simultaneously providing a broadcast program and additional information related to the broadcast program. In response to a broadcast program being edited after the list of additional information has been created, the synchronization processing unit 326 may perform an operation searching to find additional information matching a present broadcast frame.

To this end, the time information extracting unit 324 extracts time information of a broadcast frame being received. The image feature information extracting unit 322 captures an image from the broadcast frame being received, and extracts image feature information such as CLD and EHD is extracted from the captured image.

Referring to FIGS. 1 and 3, the synchronization processing unit 326 generates synchronization request information including the extracted time information and image feature information, and transmits the synchronization request information to the synchronization information providing server 200 through a network. The synchronization request information represents information used to request to receive synchronization information with respect to a broadcast frame of a predetermined broadcast program from which the time information and the image feature information have been extracted.

The synchronization information providing server 200 provides synchronization information based on the time information and image feature information included in the synchronization request information transmitted from the client apparatus 300. The synchronization information to synchronize additional information related to a predetermined broadcast program may represent one of additional information identifiers to identify at least one is piece of additional information included in the list of additional information.

The synchronization screen configuration unit 340 configures a screen having additional information with a broadcast frame related to the additional information by use of the list of additional information. The synchronization screen configuration unit 340 searches to find additional information corresponding to an additional information identifier, which is indicated by the synchronization information, in the list of additional information obtained from the synchronization information providing server 200 and then synchronizes the found additional information with a broadcast frame having the image feature information included in the synchronization request information.

Accordingly, even where time information of broadcast frames that are included in the list of additional information do not match time information included broadcast frames of a broadcast program being received at a particular time, the synchronization screen configuration unit 340 provides a frame obtained by synchronizing additional information with a broadcast frame of the broadcast program being received at the particular time.

The client apparatus 300 may further include an output unit (not illustrated) to output a scene to provide a broadcast program and information about the broadcast program. The output unit includes an audio output unit such as a speaker and a display unit to display an image.

FIG. 4 illustrates metadata and additional information that is managed by the exemplary synchronization information providing server.

As illustrated in FIG. 4, the synchronization information providing server 200 extracts time information and image feature information from broadcast frames constituting a broadcast program at predetermined time intervals and manages additional information mapped to the time information and the image feature information. Assuming that broadcast frames corresponding to a range of time 6 to time 9 are edited and a synchronization is performed only based on time information, a broadcast frame corresponding to time 10 is output at a time point in which a is broadcast frame corresponding to time 6 needs to be output. Accordingly, additional information 'yellow' corresponding to time 6 is provided and thus the broadcast frame corresponding to time 10 is not properly synchronized with additional information related to the broadcast frame.

However, referring to FIGS. 1 and 4, the client apparatus 300 may provide the synchronization information providing server 200 with synchronization request information including time 6 and information 'blue' serving as image feature information corresponding to time 6. Where the synchronization information providing server 200 recognizes that 'yellow' is stored as image feature information corresponding to the time information of 6, the synchronization information providing server 200 determines that the client apparatus 300 is receiving an edited broadcast program.

Accordingly, the synchronization information providing server 200 compares image feature information corresponding to a predetermined time section interposing time 6, for example, the synchronization information providing server 200 compares image feature information corresponding to between time 1 and time 10 with the image feature information of 'blue' included in the synchronization request information. The synchronization information providing server 200 provides, as synchronization information, the client apparatus 300 with additional information identifier indicating additional information 'blue' which corresponds to time 10 and is determined to have the highest similarity as the comparison result. Accordingly, the client apparatus 300 may configure a synchronized frame including additional information 'blue' related to the broadcast frame of time 10.

FIG. 5 illustrates a list of pieces of additional information that is provided from the synchronization information providing server 200 to the client apparatus 300.

As illustrated in FIG. 5, the list of pieces of additional information provided from the synchronization information providing server 200 to the client apparatus 300 includes broadcast program identifying information, at least one piece of additional information mapped to time information and image feature information of a broadcast frame to be synchronized, and an identifier to identify the at least one piece of additional information.

Where the time information included in the list of additional information represents an elapse time after starting of a broadcast program, the client apparatus 300 provides additional information about a predetermined broadcast program, which is received at a particular time, by use of the time information. For example, additional information corresponding to an additional information identifier 1 is a music video, the additional information is provided 13 minutes 57 seconds after the start of a broadcast program, and the additional information is provided together with a broadcast frame having image feature information 'red.'

In response to an edited broadcast frame being transmitted, the client apparatus 300 transmits a synchronization request to the synchronization information providing server 200 at predetermined time intervals. Even where an edited broadcast program is transmitted, the client apparatus 300 may provide additional information related to a present broadcast frame using the synchronization information received from the synchronization information providing server 200.

Figure 6:
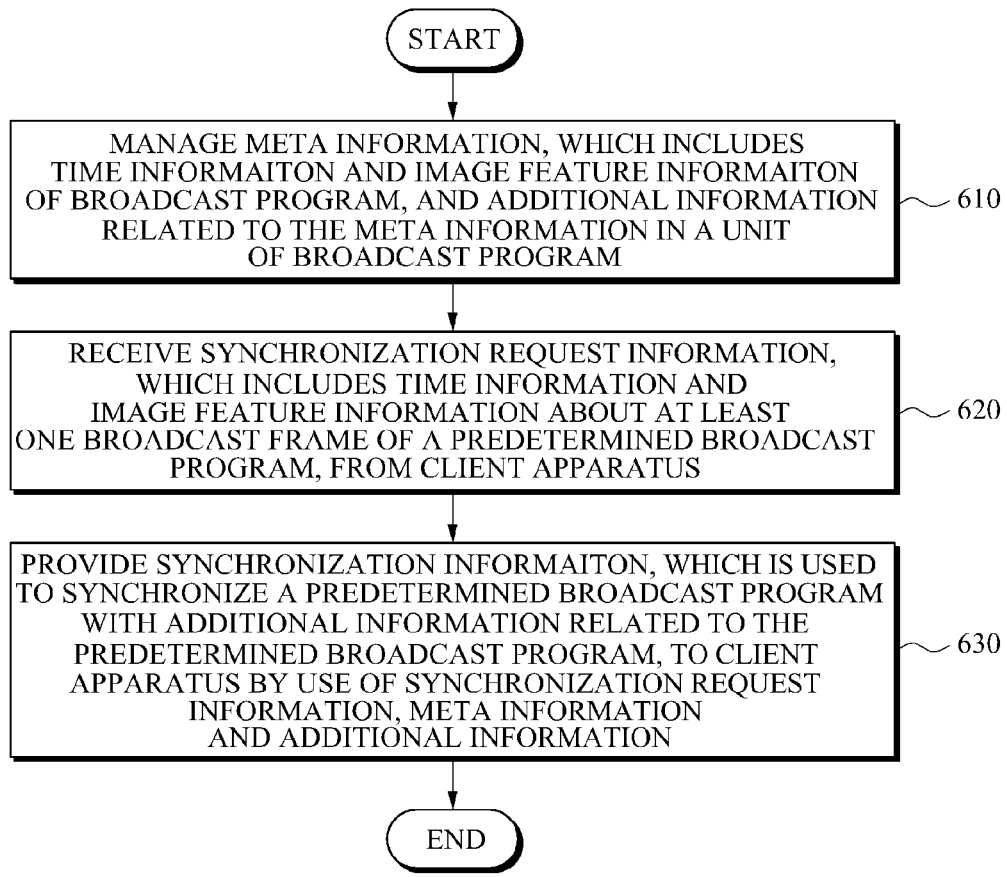
FIG. 6 is a view illustrating an example of a method of providing synchronization information from the synchronization information providing server.

FIG. 6 illustrates an example of method of providing synchronization information from the synchronization information providing server.

The synchronization information providing server 200 manages metadata and additional information related to the metadata in a unit of a broadcast program at 610. The metadata includes time information and image feature information of broadcast frames constituting the broadcast program. The metadata is generated by extracting the time information and the image feature information from the broadcast frames at regular time intervals preset corresponding to each of the broadcast programs.

The synchronization information providing server 200 receives synchronization request information, which includes time information and image feature information about at least one broadcast frame of a predetermined broadcast program, from the client apparatus 300 at 620. Before receiving the synchronization request information, the synchronization information providing server 200 may provide a list of additional information that includes broadcast program identifying information, at least one piece of additional information mapped to time information and image feature information of a broadcast frame to be synchronized, and an identifier to identify the at least one piece of additional information.

The synchronization information providing server 200 provides the client apparatus 200 with synchronization information to synchronize the predetermined broadcast program with additional information related to the predetermined broadcast program by use of the synchronization request information, the metadata and the additional information at 630. The synchronization information providing server 200 searches to find metadata of the predetermined broadcast program to provide the client apparatus 300 with additional information identification information mapped to one of a plurality of image feature information, which is related to a plurality of time information corresponding to a predetermined time section including the time information included in the synchronization request information and is determined to be similar to the image feature information included in the synchronization request information, as the synchronization information. Such an operation of the synchronization information providing server 200 is performed in response to the synchronization request information being received by the synchronization information providing server 200.

Figure 7:
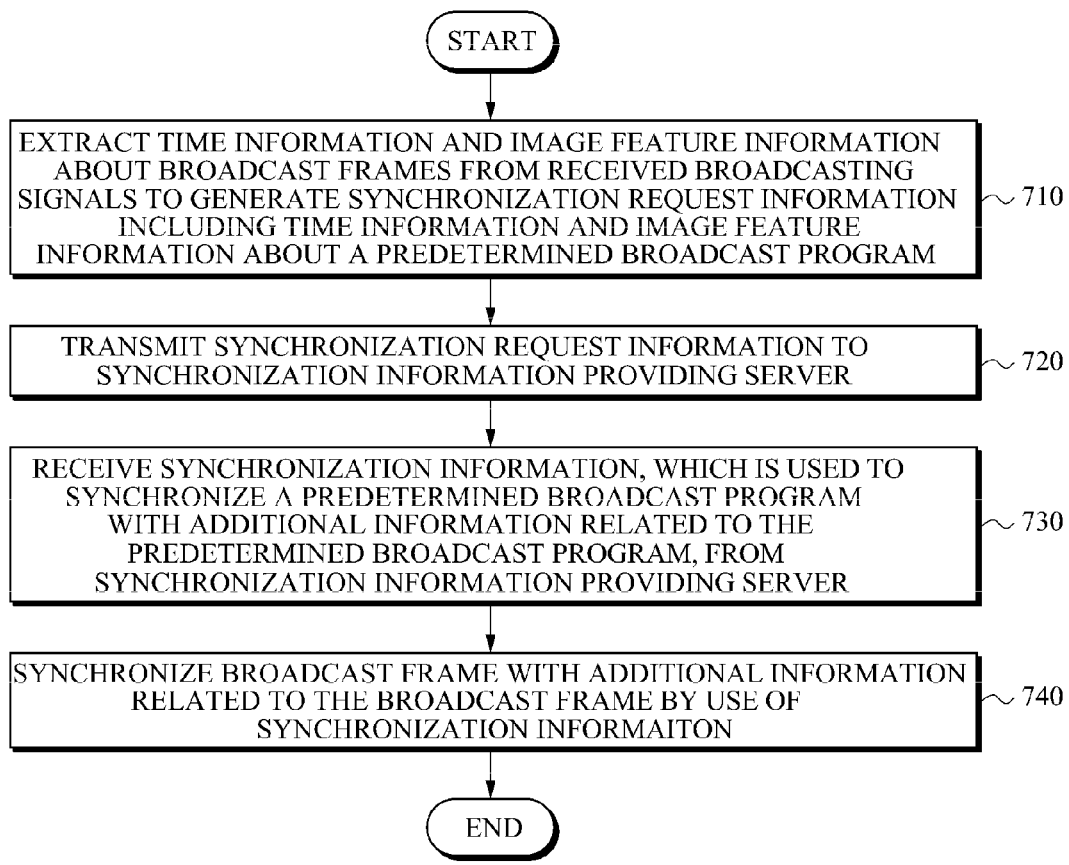
FIG. 7 is a view illustrating an example of a method of synchronizing additional information related to a broadcast program in the client apparatus.

FIG. 7 illustrates an example of a method of synchronizing additional information related to a broadcast program in the client apparatus 300.

After a predetermined broadcast program starts, the client apparatus 300 receives and stores a list of additional information including broadcast program identifying information, at least one piece of additional information mapped to time information and image feature information of a broadcast frame to be synchronized, and an identifier to identify the at least one piece of additional information.

The client apparatus 300 generates synchronization request information by extracting time information and image feature information about a broadcast frame from a broadcast signal at 710.

The client apparatus 300 transmits the synchronization request information to the synchronization information providing server 200 at 720. The client apparatus 300 receives synchronization information from the synchronization information providing server 200 at 730. The synchronization information is used to synchronize a predetermined broadcast program with additional information related to the predetermined broadcast program. The synchronization information to synchronize additional information related to a predetermined broadcast program may represent one of additional information identifiers to identify at least one piece of additional information included in the list of additional information.

The client apparatus 300 synchronizes a broadcast frame with additional information related to the broadcast frame by use of the synchronization information at 740. Accordingly, the client apparatus 300 configures a synchronization frame by synchronizing additional information with a broadcast frame related to the addition information by use of additional information corresponding to the additional information identifier indicated by the synchronization information.

According to the above example embodiments, a broadcast frame is synchronized with to additional information by use of image feature information in addition to time information. Accordingly, even where a broadcast program is edited and thus time information of the broadcast program is changed, image feature information similar to image feature information of a broadcast to be synchronized is searched and additional information related to the found image feature information is provided. Accordingly, even where a broadcast program is edited and broadcasted, a broadcast frame of the edited broadcast program may be synchronized with additional information related to the broadcast frame by use of the list of additional information created corresponding to each broadcast program.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or is supplemented by other components or their equivalents. Accordingly, other implementations are within the scope of the following claims.

What is claimed is:

1. A synchronization information providing server comprising:
   an additional information manager configured to manage metadata of each of frames of a broadcast program, and additional information about each of the frames that is mapped to the respective metadata, the metadata comprising first time information and first image feature information of the frames; and
   a synchronization manager configured to
   receive, from a client apparatus, synchronization request information comprising second time information and second image feature information of a broadcast frame of a predetermined broadcast program,
   determine whether the second image feature information is different than the first image feature information of a frame among the frames that corresponds to the second time information,
   compare the second image feature information with the first image feature information of each of the frames that is in a predetermined time range adjacent to the second time information, when the second image feature information is determined to be different than the first image feature information of the frame, and
   provide, to the client apparatus, identification information of the additional information about one of the frames that is mapped to the respective first image feature information determined to be most similar to the second image feature information, to synchronize the predetermined broadcast program with the additional information related to the predetermined broadcast program.

2. The synchronization information providing server of claim 1, wherein the additional information manager is further configured to:
   record the broadcast program based on electric program guide (EPG) information; and
   generate the metadata while the recording is being performed.

3. The synchronization information providing server of claim 1, wherein the additional information manager is further configured to extract the first time information and the first image feature information from one of the frames at predetermined times preset corresponding to the broadcast program, to generate the metadata.

4. The synchronization information providing server of claim 1, wherein, before the receiving of the synchronization request information, the synchronization manager is further configured to provide, to the client apparatus, a list of additional information comprising broadcast program identifying information, the additional information about each of the frames that is mapped to the respective metadata to be synchronized, and an identifier of each of the frames that identifies the respective additional information.

5. The synchronization information providing server of claim 1, wherein each of the first time information and the second time information comprises system time table (STT) information and a system information protocol (PSIP).

6. The synchronization information providing server of claim 1, wherein each of the first image feature information and the second image feature information comprises an MPEG-7 color layout descriptor (CLD), or an MPEG-7 edge histogram descriptor (EHD), or any combination thereof.

7. The synchronization information providing server of claim 1, wherein the synchronization manager is further configured to:
   receive, from the client apparatus, the synchronization request information at preset time intervals; and
   provide, to the client apparatus, the identification information based on the synchronization request information received at the preset time intervals.

8. The synchronization information providing server of claim 1, wherein the synchronization manager is further configured to:
   determine that the client apparatus is receiving an edited broadcast program, when the second image feature information is different than the first image feature information of the frame; and
   compare the second image feature information with the first image feature information of each of the frames that is in the predetermined time range adjacent to the second time information, when the client apparatus is determined to receive the edited broadcast program.

9. A method of providing synchronization information, comprising:
   managing metadata of each of frames of a broadcast program, and additional information about each of the frames that is mapped to the respective metadata, the metadata comprising first time information and first image feature information;

receiving, from a client apparatus, synchronization request information comprising second time information and second image feature information of a broadcast frame of a predetermined broadcast program;

determining whether the second image feature information is different than the first image feature information of a frame among the frames that corresponds to the second time information;

comparing the second image feature information with the first image feature information of each of the frames that is in a predetermined time range adjacent to the second time information, when the second image feature information is determined to be different than the first image feature information of the frame; and providing, to the client apparatus, identification information of the additional information about one of the frames that is mapped to the respective first image feature information determined to be most similar to the second image feature information, to synchronize the predetermined broadcast program with the additional information related to the predetermined broadcast program.

10. The method of claim 9, wherein the managing comprises:
   recording the broadcast program based on electric program guide (EPG) information; and
   generating the metadata while the recording is being performed.

11. The method of claim 9, wherein the managing comprises extracting the first time information and the first image feature information from one of the frames at predetermined time intervals preset corresponding to the broadcast program, to generate the metadata.

12. The method of claim 9, further comprising, before the receiving of the synchronization request information, providing, to the client apparatus, a list of additional information comprising broadcast program identifying information, of the additional information about each of the frames that is mapped to the respective metadata to be synchronized, and an identifier of each of the frames that identifies the respective additional information.

13. The method of claim 9, further comprising:
   receiving, from the client apparatus, the synchronization request information at preset time intervals; and
   providing, to the client apparatus, the identification information based on the synchronization request information received at the preset time intervals.

* * * * *